United States Patent Office 3,689,410
Patented Sept. 5, 1972

3,689,410
DRY MIX FOR CHALK-STABILIZED EMULSION
Henry C. H. Darley and Jack M. Jackson, Houston, Tex., assignors to Shell Oil Company, New York, N.Y.
No Drawing. Filed May 21, 1970, Ser. No. 39,526
Int. Cl. C10m 1/06, 1/10, 1/14
U.S. Cl. 252—8.55 R          2 Claims

ABSTRACT OF THE DISCLOSURE

A dry mix for preparing a soluble well completion fluid comprises powdered chalk particles containing adsorbed oil wetting and interfacial tension lowering surfactants and having particle sizes and surfactant proportions such that the chalk particles provide both stability and low filter loss in a water-in-oil emulsion.

CROSS REFERENCE TO RELATED PATENT APPLICATION

This application is related to a copending and commonly assigned patent application by H. C. H. Darley, Ser. No. 787,139, filed Dec. 26, 1968 (now Pat. No. 3,525,397). The copending patent application describes water-in-oil emulsions that: are stabilized by finely divided particles of acid soluble material, are useful as well completion fluids, and are prepared by mixing the individual components near the location and time at which the emulsion is to be used. The present application differs from the copending patent application in being directed to a dry mix containing preblended components for a carbonate particle stabilized water-in-oil emulsion.

BACKGROUND OF THE INVENTION

This invention relates to a substantially free-flowing powder which is adapted to be mixed with oil and water to form a chalk-stabilized water-in-oil (invert) emulsion. An emulsion formed in accordance with the present invention is particularly useful as a soluble well completion fluid, i.e., as a pumpable fluid that forms a filter cake that is relatively impermeable until it is contacted with acid and then is dissolved to form a pumpable fluid. Such an emulsion is also useful as a viscous pumpable fluid which, when contacted by acid, is converted to a relatively nonviscous fluid.

As indicated in the copending patent application, solid particles used in conventional completion and workover fluids have tended to become embedded in permeable earth formations and have caused various types of permeability impairment. On the other hand, solid particles are needed in a well completion fluid, in order to bridge the pores or fractures in a permeable earth formation or reservoir and thus prevent a wholesale loss of fluid. The acid soluble particle stabilized water-in-oil emulsions described in the copending patent application preferably contain both an oil wetting surfactant, to cause the solid particles to become adsorbed on the surfaces of the emulsion droplets, and an interfacial tension lowering surfactant, to facilitate the mixing of the solid particles with the water and oil. The acid soluble solid particles described in the copending application have a relatively narrow range of sizes, since their main function is to bridge across the pores or openings in relatively permeable reservoirs. In preparing carbonate particle stabilized emulsions (e.g. chalk emulsions) as described in the copending patent application, variations are made in the specific proportions of the chalk, the oil wetting surfactant, and/or the interfacial tension lowering surfactant, in order to adjust the properties of the emulsion to the individual conditions of downhole temperature and/or contamination by clay or salty connate water, or the like.

Such a capability of being adjustable is desirable, to provide flexibility; but, such a need for proportioning so many components in a field location is disadvantageous, in requiring considerable technical supervision and equipment that is not ordinarily available.

The present invention is, at least in part, premised on a discovery that by appropriately proportioning sizes of particles of powdered chalk and relative amounts and compositions of oil wetting and interfacial tension lowering surfactants, such components of a chalk emulsion can be preblended to form a dry mix which retains a significant degree of flexibility and greatly improves the field mixing procedure for forming an emulsion.

SUMMARY OF THE INVENTION

The present invention comprises a substantially free-flowing powdered mixture of surfactant coated acid soluble carbonate particles having relatively uniformly distributed sizes ranging from about 0.01 to 50 microns. At least one oil wetting surface active material, and, peferably, at least one interfacial tension lowering surface active material, is adsorbed on the carbonate particles. The proportioning of the sizes of the particles and the compositions and relative amounts of the surfactants are adjusted so that the particles are capable of dispersing in and stabilizing a water-in-oil emulsion that has a relatively low filter loss.

DESCRIPTION OF THE INVENTION

The carbonate material used in this invention can be composed of substantially any acid soluble inorganic carbonate solid, such as one or more alkaline earth metal carbonates and/or alkali metal carbonates. Chalk, or relatively pure calcium carbonate, is preferred. The size range of the particles is important. The range of sizes should include some very fine particles and some particles large enough to bridge the largest pores of substantially all permeable earth formations other than those which are characterized by lost circulation problems (the problems caused by large interconnected fractures, caverns, or the like). Such "very fine" particles preferably have sizes of from about 0.01 to 0.2 micron and such "bridging size" particles preferably have sizes of from about 0.2 to 44 microns. The amount of particles and the size range of the particles should be such that the "mud spurt" (the invasion of formation by whole mud while a filter cake is being formed) is relatively low. The mud spurt is low when the emulsion contains an adequate distribution of particle sizes in the bridging size range and an adequate total proportion, in the order of at least one percent by weight, of solid particles.

In order to minimize the possibility of impairing the permeability of a reservoir, the concentration of solids in the stabilized emulsion should be kept relatively low. Although this might seem unnecessary, since the solids are carbonates which can be dissolved by acid, in a well there is always the possibility that some of the carbonates will not be contacted by an acid that is circulated (and/or spotted) within the well in order to remove the soluble filter cake. Furthermore, it has been shown that where the solid particle content is kept relatively low, the filter cakes formed by chalk emulsions are relatively soft and can be easily removed. In the microfractures that are commonly encountered in carbonate reservoirs, it may be difficult to remove a harder cake, such as one that would be formed by an emulsion containing significantly more than from about 1 to 2 percent by weight of chalk particles.

Investigations of the possibility of using the carbonates and surface active materials which are described in the copending patent application as basis for a dry mix, from which a chalk emulsion could be prepared, indicated that those materials were not directly applicable. The adsorptive capacity of the carbonate powders described in the copending application (which have a relatively limited range of sizes of from about 0.5 to 50 microns) was not sufficient to carry the needed amount of liquid surfactants. In addition, when the surfactants described in the copending application were adsorbed on powdered carbonates, the powders tended to form hard aggregates due to the evaporation of relatively volatile components, such as the isopropyl alcohol used to solubilize a preferred interfacial tension lowering surfactant, Redicote $E_{11}$ (quaternary ammonium chloride, Armour Chemical Company).

In the present formulation, although a single combination of carbonates and surfactants cannot satisfy all of the conflicting requirements of all of the conditions which are likely to be encountered in field operations, the present formulation is adapted to provide emulsions having substantially optimum properties under the most usual conditions. In the preferred embodiments of the dry mix, the components are proportioned so that the resulting water-in-oil emulsion contains about one percent carbonate powder in the bridging size range (0.2 to 44 microns) plus enough fines (less than 0.2 micron) to stabilize the emulsion. i.e., a total of about 1.5 percent solids. The adsorptive capacity of the powder must be such that from about 1 to 2 percent will carry enough adsorbed surfactants to yield an emulsion having good stability. "Good stability" refers to being stable during well drilling operations (or other use) under normal conditions, but being capable of breaking within a few days thereafter. When desired, an increased ability to meet more severe conditions (high temperatures, contamination by clay, etc.) may be obtained by adding more of the dry mix.

Examples of commercially available carbonate powders that have various size ranges and can be used in the present invention include: in the fines range, precipitated chalk from Curtin, Multifex (precipitated chalk 0.06 micron median particle size, Diamond Alkali) Suspenso (precipitated chalk 0.2 micron median particle size, Diamond Alkali), Millical (median particle size 0.4 micron, Diamond Chemicals), and, within the bridging size range, Gamma Sperse (ground carbonate, 4 micron median particle size, Georgia Marble Company).

In general, the oil wetting agent used in the present invention should be a substantially nonvolatile liquid surface active material which is readily adsorbed on carbonate solids. High molecular organic acids and/or their salts which are substantially unreactive with carbonates, such as individual or mixed organic acids containing about 12 or more carbon atoms are suitable. Examples of commercially available acids include Acintol FA series (crude oleic and linoleic acid, Arizona Chemical Company) AD273 (sorbitan sesquioleate, Aquaness Chemical Company), Redicote TXO (diamine salts of fatty acids, Armour Chemical Company), and the like.

The interfacial tension lowering surfactant, which is preferably used in the present invention, should be a substantially nonvolatile liquid surfactant having a composition which provides a hydrophilic lipophilic balance (HLB) of functional groups in the vicinity of four, so that the material is an effective emulsifying agent for emulsifying water-in-oil. Even small quantities of surfactants having significantly higher HLB's tend to destabilize the emulsions prepared from the present dry mix. Where, for example, it is feasible to employ rigorous stirring and/or shearing action in mixing the dry mix with water and oil to form the emulsion and/or the operation in which the emulsion is used can be completed within a relatively short time, the interfacial tension lowering surfactant can be omitted. Examples of commercially available materials suitable for use in the invention included Aquel 277 (a polyoxyethylene sorbitol derivative of cotton seed oil, Aquaness), Ethoduomeens $T_{13}$, $T_{20}$ and $T_{25}$ (ethoxylated aliphatic diamines, Armour), and the like. The Ethoduomeen $T_{13}$ is particularly suitable.

Various properties and results of the present process for making and using the present dry mixes and the chalk emulsions formed from them are exemplified by the following experiments and data.

Adsorptive capacities of various carbonate powders were tested by mixing increasing proportions of a preferred mixture of surfactants (three parts of oil wetting surfactant $FA_1$ to one part interfacial tension lowering surfactant $T_{13}$) with each powder until it started to feel plastic when rolled between the finger and thumb. The so-determined proportion of surfactants was considered to be the maximum which could be carried in practice. If this maximum were exceeded, small plastic balls were formed and would be difficult to disperse when making the emulsion. The tests showed that, in general, the adsorptive capacity of the powders decreased with increases in particle size. In selecting a carbonate powder for further tests, Wingdale was used for the larger bridging particles and mixed with Multifex to provide adequate fines and high adsorptive capacity.

Table I shows properties of emulsions containing three percent of each of four treated powders, having different ratios of Multifex to Wingdale, with each of the powders being treated to its capacity with the surfactant mixture.

It is apparent that the properties of an emulsion made with the 1 to 2 ratio were considerably better than those made with the 1 to 4 ratio, particularly after a 20-hour roll at 200° F. and after contamination with shale. The mud spurt increased sharply when ratios greater than 1 to 2 were used. The 1 to 2 ratio is particularly suitable and has been used in further tests.

TABLE I.—PROPERTIES OF EMULSIONS MADE WITH MULTIFEX/WINGDALE MIXTURES
[40% oil, 60% 6% NaCl, 3% treated powder; surfactants—3 parts $FA_1$, 1 part $T_{13}$]

|  | 67% Multifex, 33% Wingdale, 24 cc./100 g. surfactants | 50% Multifex, 50% Wingdale, 20 cc./100 g. surfactants | 33% Multifex, 67% Wingdale, 18 cc./100 g. surfactants | 20% Multifex, 80% Wingdale, 13 cc./100 g. surfactants |
|---|---|---|---|---|
| Centrifuge stability at 75° F., percent oil/percent water/percent translucent | 1/1.2/0 | 1/1/0 | 2/1/0 | 6/2/0 |
| After rolling 2 hours, 200° F | 1/1.5/0 | 1/3/0 | 3/3/0 | 10/3/0 |
| After rolling 20 hours, 200° F | 20/0/8 | 12/0/8 | 21/0/20 | 38/0/62 |
| Fann PV/YP, cp./(lb./100 ft.²) | 46/25 | 54/25 | 42/20 | 40/16 |
| API filter loss cc./30 minutes | 3.8 | 2.7 | 3.3 | 3.3 |
| After rolling 20 hours, 200° F. (not mixed) | 4.9 | 4.9 | 10 | 42 |
| Acid breaking time, minutes | 25 | 20 | 16 | 13 |
| Breaking time at 160° F | (¹) | (¹) | (¹) | (¹) |
| Mud spurt | 17 | 22 | 6.5 | 4.5 |
| After 2% Glenrose shale intermixed: |  |  |  |  |
| Centrifuge stability 75° F | 5/28 | 6/30 | 12/33 | 22/40 |
| API filter loss, cc./30 minutes | 3.8 | 3.3 | 4.4 | 5.5 |
| An extra 3% powder added to shale contaminated sample, centrifuge stability | 0/0 | 0/0 | 1/2 | 3/07 |

¹ More than 1 week.

With respect to the tabulated properties and results, mixing procedure for making the chalk emulsion was to mix the dry surfactant-coated powder and oil in a Hamilton Beach mixer. This caused the powder to disperse within several minutes and, when water was added, the emulsion formed at once. Alternatively, the coated powder can be dusted in while the oil and water are being mixed together. The latter procedure readily forms an emulsion, and no difference in the properties is apparent.

Emulsion stability was measured by centrifuging the emulsion for ten minutes at 3000 r.p.m. in an oil gaugers centrifuge (API Code 2500). The volumes of oil separating at the top and of clear water separating at the bottom were measured.

Standard API methods were used to measure Fann plastic viscosity and yield value (viscosity reported in centipoises and yield value in pounds per 100 square feet) as well as the Thirty Minute Filter Loss.

The reactivity of the emulsions to acids was tested by floating 5 cc. of emulsion on 5 cc. of acid in a 10 cc. graduate and placing it in an air bath at 160° F. The acid used was 15 percent HCl plus 0.5 percent of HA145 and 0.2 percent N5 (corrosion inhibitor and wetting agent, respectively, both from Halliburton). With respect to the Emulsion Breaking, the time at 160° F. for the emulsion to become coarse enough to be transparent was taken as the end point.

The effect of Shale Contamination was tested by mixing the emulsion with 2 percent ground Glenrose shale in a Hamilton Beach mixer, then measuring the centrifuge stability and filter loss. This is substantially equivalent to drilling an 8-inch hole to about 140 feet of shale assuming 100 percent dispersing of the cuttings and a 1000 barrel mud system.

The Mud Spurt was evaluated by filtering the emulsion against an unconsolidated sandpack of 80 to 120 mesh sand having a permeability of about seven darcies. The test emulsion was placed under 100 p.s.i., released to flow into the mud by opening a valve, and measurements were made of the volume of the fluid that was discharged.

Typical properties and test results are listed in Table II. It should be noted that although somewhat more stable emulsions are obtained when an oil wetting and an interfacial tension lowering surfactant are present in a 1 to 1 ratio, it may be preferable to use the 3 to 1 ratio in order to ensure that the emulsion will break easily. Also, as mentioned above, in certain situations it may be desirable to omit the interfacial tension lowering surfactant. A particularly suitable dry mix formulation comprises: 33 pounds Multifex, 67 pounds Wingdale, 1.6 gallons $FA_1$, and 0.54 gallon $T_{13}$.

TABLE II.—PERFORMANCE OF EMULSIONS MADE WITH ONE PART MULTIFEX, TWO PARTS WINGDALE

| Experiment No. | Oil/water ratio | Salinity aqueous phase | $FA_1/T_{13}$ ratio | Treat. powder | Cent. stab. percent oil/water/translucent at— | | | | API filter loss | | Breaking time | | Plus 2% Glenrose shale | |
|---|---|---|---|---|---|---|---|---|---|---|---|---|---|---|
| | | | | | 75° F. | 2 hr. 200° F. | 20 hr. 200° F. | Fann, PV/YP | 75° F. | After 20 hr. at 200° F. | Acid | At 160° F. | Cent. stab. | Fil. loss |
| Emulsions made with 1/2 Multifex/Wingdale blend plus 18 cc./100 g. 1/1 $FA_1/T_{13}$ mixture | | | | | | | | | | | | | | |
| 1 | 40/60 | 6 | 1/1 | 1.5 | 13/3/0 | 20/0/25 | 33/0/46 | 42/13 | 3.8 | | 18 minutes | 1 day | 20/45/0 | 5 |
| 2 | 40/60 | 6 | 1/1 | 3 | 0/1/0 | 2/0/0 | 11/0/0 | 46/19 | 3.3 | | 21 minutes | >1 week | 9/30/0 | 5.2 |
| 3 | 60/40 | 6 | 1/1 | 3 | 14/0.4/0 | 19/0/2 | 42/0/8 | 15/10 | 3.5 | | 15 minutes | do | 14/0/0 | 4.9 |
| 4 | 40/60 | (1) | 1/1 | 3 | 2/0.8/0 | 2/0.8/0 | 4/0/2 | 55/23 | 4.4 | | 12 minutes | do | 8/18/0 | 2.7 |
| Emulsions made with standard formula (3/4 Multifex/Wingdale plus 18 cc./100 g. 3/1 $FA_1/T_{13}$ mixture | | | | | | | | | | | | | | |
| 5 | 30/70 | 6 | 3/1 | 1.5 | 4/5/0 | 11/3/0 | | 73/26 | 4.4 | | 18 minutes | 1 day | 20/65/0 | 71 |
| 6 | 40/60 | 6 | 3/1 | 1.5 | 13/3/0 | 25/3/35 | | 42/11 | 5 | | 17 minutes | 3 days | 45/27/0 | |
| 7 | 60/40 | 6 | 3/1 | 1.5 | 40/3/0 | 50/0/35 | | 14/5 | 6 | | 12 minutes | 4 days | 3/40/0 | 10 |
| 8 | 30/70 | 6 | 3/1 | 3 | 0/0.4/0 | 1/2/0 | 7/0/0 | (3) | 3.8 | 5 | 24 minutes | >1 week | 12/33/0 | 4.4 |
| 9 | 40/60 | 6 | 3/1 | 3 | 2/1/0 | 3/3/0 | 21/0/0 | 42/20 | 3.3 | 10 | 16 minutes | do | 28/7/0 | 4.4 |
| 10 | 40/60 | 6 | 3/1 | 3 | 25/5.6/0 | 40/3/0 | 48/0/30 | 14/5 | 5.5 | 6.6 | 15 minutes | do | 15/0/0 | 5.5 |
| 11 | 60/40 | 6 | 3/1 | 6 | 4/0/0 | 0/0.5/0 | 3/0/1 | 50/43 | 5.5 | | 21 minutes | do | 0/0/0 | 5.5 |
| 12 | 60/40 | 6 | 3/1 | 6 | 0/0/0 | 12/0/1 | 17/0/2 | 17/16 | 4.4 | | 15 minutes | do | 18/37/0 | 2.7 |
| 13 | 40/60 | (2) | 3/1 | 3 | 3/2/0 | 5/6/0 | 9/2/0 | 47/24 | 4.4 | | 12 minutes | do | | 6.5 |
| Weighted emulsion to 11.7 lb./gal. with §10 white | | | | | | | | | | | | | | |
| 14 | 60/40 | 6 | 3/1 | 10 | 0/0/0 | 1/0/0 | 17/0/0 | 63/40 | 2.2 | | Immediate | >1 week | 1/0/0 | 2.2 |
| Crude oils | | | | | | | | | | | | | | |
| 15 | 60 (Benton)/40 | 6 | 3/1 | 3 | 17/0.3/0 | | | 35/51 | 4 | | | | | |
| 16 | 60 (Ventura)/40 | 6 | 3/1 | 3 | 5/0/0 | | | 85/27 | 0 | | | | | |
| 17 | 60 (Cedar Creek)/40 | 6 | 3/1 | 3 | 5/0.1/0 | | | 113/30 | 3.5 | | | | | |
| 18 | 60 (Clam Lake)/40 | 6 | 3/1 | 3 | 34/0/0 | | | 32/26 | 3.8 | | | | | |
| 19 | 60 (Paluxy)/40 | 0 | 3/1 | 3 | 4/0/0 | | | 36/22 | 3.8 | | | | 6/00 | |
| 20 | 60 (Rodessa)/40 | 0 | 3/1 | 3 | 35/0.2/0 | | | 17/26 | 7.7 | | | | | |
| 21 | 60 (Wishert)/60 | 6 | 3/1 | 3 | 5/2/0 | | | 77/79 | 3.8 | | | | 23/35 | |
| 22 | 40 (BSU)/60 | 6 | 3/1 | 3 | 6/4/0 | | | 44/33 | 3.8 | | | | 25/50 | |
| 23 | 40 (Kilgore)/60 | 6 | 3/1 | 3 | 14/1/0 | | | 68/53 | 1.6 | | | | 23/55 | |
| 24 | 35 plus 5 (Protectom)/60 | 6 | 3/1 | 3 | 3/0.2/0 | 10/0.6/0 | | 61/20/6 | 1.1 | | | | 10/34/0 | |

[1] Sat. NaCl.  [2] Sat.  [3] Too high.

As indicated by experiments 5, 6, and 7 of Table II, five pounds per barrel of the dry mix makes an emulsion which will remain reasonably stable for 2 hours under moderate well conditions, and will break within a few days, when left quiescent.

Experiments 8 through 12 show that the emulsion stability can be increased by increasing the proportion of dry mix.

Experiments 5 through 12 show that various viscosity and yield points can be obtained by varying the oil-to-water ratio.

Experiment 13 shows that the emulsion can be prepared with saturated sodium chloride as the water phase, with negligible effect on the properties. The weight of such an emulsion is 8.82 pounds per gallon. Higher densities can be obtained by using lower oil-to-water ratios and higher density oils. If still higher densities are required, ground carbonates can be added.

Note that while the emulsions were destabilized by contamination with ground shale, the extent depending on the oil-water ratio and the amounts of dry mix used, the destabilized emulsions were restored by adding more dry mix. The emulsion used in experiment 6 was mixed with 2 percent ground green cement and severely destabilized. Its properties were partially restored by adding 3 percent of the dry mix and adjusting the pH, back to about seven, with monobasic sodium phosphate.

The emulsions provided by the present invention coat dry steel surfaces with an oily film and inhibit corrosion. This was shown by tumbling steel coupons in tubes three-quarters full of the test fluid. The emulsions tested were made with 40 percent diesel oil and 60 percent fresh water saturated with hydrogen sulfide. Such emulsions were compared with the same emulsions made without the hydrogen sulfide or with water saturated with hydrogen sulfide. The results are shown in Table III.

TABLE III

| Test fluid: | Corrosion, mg./year |
|---|---|
| Emulsion made with 1.5% treated powder, no $H_2S$ | 0.45 |
| Emulsion made with 1.5% treated powder, with $H_2S$ | 0.66 |
| Emulsion made with 3% treated powder, no $H_2S$ | 0.57 |
| Emulsion made with 3% treated powder, with $H_2S$ | 0.74 |
| Water saturated with $H_2S$ | 16.7 |

The hydrogen sulfide did not significantly affect the stability or rheological or filtration properties of the emulsion.

A series of tests with various crude oils indicated that a wide variety of crude oils can be used as an oil phase of the emulsions.

Examples of such crude oils include Benton, Ventura, Cedar Creek, Clam Lake, Paluxy, Rodessa, Weshert, Kilgore, and the like crude oils.

In general, the properties of the chalk emulsions prepared from the present dry mix are similar to those of the chalk emulsions described in the above-mentioned copending patent application. When the present emulsions are used for temporarily sealing earth formations having relatively large fracture openings, or when loss of circulation is a problem, the addition of coarse grains of ground carbonates to the emulsions (separately, at the well site) is recommended. In general, the most common forms of contamination can be corrected by adding more of the dry mix as long as the pH of the emulsion being circulated into the well is no higher than about seven. The emulsions made by the present process are particularly advantageous in respect to those described in the above-mentioned copending patent application with respect to (1) being capable of yielding good emulsions with salty waters which may range slightly saline to solutions as concentrated as a saturated sodium chloride brine, and (2) being an excellent corrosion inhibitor.

What is claimed is:

1. A substantially free-flowing powder for forming a soluble well completion fluid consisting essentially of:

a mixture of acid soluble alkaline earth metal carbonate particles having sizes relatively uniformly distributed throughout the range of from about 0.01 to 50 microns with said mixture containing a ratio of about 1:2 of (a) very fine particles having median particle sizes of from about 0.01 to 0.2 micron to (b) bridging size particles having median particle sizes of from about 0.2 to 44 microns;

at least one nonvolatile liquid high molecular weight fatty acid oil wetting surface active material adsorbed on said particles;

at least one nonvolatile liquid interfacial tension reducing surfactant additionally adsorbed on said particles which surfactant has a hydrophilic-lipophilic balance of about 4, being an effective emulsifier for forming water in oil emulsions and being selected from the group consisting of ethoxylated aliphatic diamines and a polyoxyethylene sorbitol derivative of cottonseed oil; and a proportioning of the sizes of said particles and the relative amount of said surfactant with the amount of adsorbed surfactant being (a) substantially enough to saturate the particles and cause them to feel plastic when rolled between the finger and thumb but less than enough to create a tendency for the coated carbonate particles to form balls and (b) an amount such that the particles are capable of dispersing in and stabilizing a water-in-oil emulsion which exhibits a relatively low filter loss.

2. The composition of claim 1 in which said components are, respectively, chalk, a mixture of surface active fatty acids, and an ethoxylated aliphatic diamine surfactant.

References Cited

UNITED STATES PATENTS

| 2,350,154 | 5/1944 | Dawson et al. | 252—8.5 M |
| 2,797,196 | 6/1957 | Dunn et al. | 252—8.5 M |
| 3,046,222 | 7/1962 | Phansalkar et al. | 252—8.55 R |
| 3,525,397 | 8/1970 | Darley | 166—308 X |
| 2,900,337 | 8/1959 | Earley et al. | 252—8.5 M |
| 3,099,624 | 7/1963 | Wilson | 252—8.5 M |
| 2,965,566 | 12/1960 | Hoeppel | 252—8.5 M |
| 2,668,749 | 2/1954 | McHan | 23—66 |

HERBERT B. GUYNN, Primary Examiner

U.S. Cl. X.R.

252—8.5 P, 384